Patented Nov. 28, 1939

2,181,786

UNITED STATES PATENT OFFICE 2,181,786

MANUFACTURE OF HOLLOW BODIES AND CONTAINERS FROM ARTIFICIAL RESINS

Heinrich Hoenig, Dusseldorf, Germany, assignor to Richard Collins and John Joseph Sheridan, both of Dublin, Ireland, and Philip Morris Scher, London, England No Drawing. Application May 25, 1935, Serial No. 23,523. In Germany May 25, 1934

4 Claims. (Cl. 18—55)

The present invention relates to improvements in or relating to the manufacture of hollow bodies or containers from artificial resins. The invention is more particularly applicable to the manufacture of hollow articles which include one or more relatively narrow neck portions and one or more relatively enlarged portions.

Pressed articles from artificial resins are formed in suitable moulds at a high temperature under pressure. For this purpose in the production of hollow articles a pressure ram has been used in conjunction with a suitable matrix or mould. If the articles to be produced have extensions and openings which are not parallel to the direction of movement of the ram it has been necessary in the past to provide separate rams and pertaining matrix parts for the several extensions and openings.

Hitherto it has not been possible to produce hollow bodies and containers having enlarged cross sections within the mouth, such for instance as bottle shaped articles from artificial resins and the like owing to the difficulty of devising suitable rams which can be passed through the neck or narrow cross section of the hollow body or container and can then be expanded laterally to exert the necessary pressure on the material of the walls of the body.

It is an object of the present invention to provide an improved method of manufacturing hollow bodies, containers or bodies having one or more hollow portions, from artificial resins.

I am aware that it has been proposed to shape hollow articles of cellulose derivatives by introducing air under pressure into the interior of partially shaped hollow blanks to force these in heated or otherwise softened condition outwards to conform to the shape of an enclosing mould. It has also been proposed to shape artificial resins comprising polymerised compositions of vinyl derivatives for example esters of acrylic acid or polystyrol by heating them by hot air or other means until plastic and then blowing them to shape as in processes for working glass.

As far as I am aware it has not been proposed to employ fluid under pressure as the means for applying the necessary pressure in the moulding of those artificial resins which require heat and pressure to bring them into the finished state.

According to the present invention I provide a method of manufacturing hollow articles or vessels from artificial resins, especially such articles as have constrictions, enlargements or extensions by moulding under the action of heat and pressure, characterised by lining the interior of a separable mould with the mouldable artificial resin composition for example a moulding powder and applying the necessary pressure by means of a fluid admitted under pressure to the interior of the mould.

It will be understood that the mould and/or the pressure fluid may be heated.

Any suitable pressure medium may be employed either gaseous such as air for example or a suitable liquid may be employed.

The mouldable composition may be applied to the interior of the mould in any suitable manner. Thus for example the article to be made may first be shaped in any suitable number of parts which are subjected to a preliminary pressure by means of rams and matrices to give them a sufficient degree of cohesion to retain their shape in the further treatment. These parts are then assembled in a suitable mould to form the complete hollow body, the mould closed and secured and then fluid under the necessary pressure is applied within the article whilst heat is applied to it in any suitable way.

Thus for example a bottle or the like may be formed in two halves by preliminary pressing operations which may be carried out in the halves of the mould to be used for the final pressure or in separate moulds. In the latter event the two halves so pressed into shape are transferred to the mould. The mould is closed and the mould is brought to the desired temperature such as is employed in the thermoplastic moulding of such compositions and then air, water or other suitable fluid is supplied to the interior of the article under the necessary pressure for the completion of the reaction (e. g. condensation).

The two halves from which the articles are made may be separated by a line of division of any suitable form, for example a line extending longitudinally or transversely.

The pressure medium presses the two parts, which have been subjected to preliminary pressure, against the walls of the mould whereby the material is uniformly distributed and the two halves are intimiately bound together. After pressing the separable mould is opened and the finished article is removed.

According to a further feature of the invention I provide a method of manufacturing hollow articles or vessels from artificial resins, especially such articles as have constrictions or enlargements or extensions, by moulding under the action of heat and pressure characterised by lining the interior of a mould by blowing or spraying the artificial resin composition and then admitting fluid under pressure to the interior of the mould under the requisite temperature conditions.

In carrying out this feature of the present invention the mould must as a rule be separable so that the finished article may be removed but it can be assembled or closed while the interior is lined by spraying or blowing. After lining the mould in this way fluid under pressure is admitted and heat is applied in any suitable way for example by heating the mould and/or the fluid under pressure. Any suitable fluid may be employed for example air or gas or if desired a suitable liquid.

The composition i. e. the moulding powder adheres to the walls of the mould but if desired it may be moistened with a suitable liquid to promote adhesion to the walls of the mold.

When the heat and pressure are applied the material is uniformly distributed over the walls of the mould and the uniform distribution is assisted by the flowing properties of the composition. The method is particularly advantageously applicable to the production of hollow articles having very thin walls.

It is to be understood that in carrying out the invention the manipulative details may be varied or modified without departing from the scope of the invention.

I claim:

1. A method of manufacturing open hollow articles or vessels having at least one constriction from artificial resins by mouding under the action of heat and pressure including the steps of spraying mouldable artificial resin powder into a hollow mould through a constriction therein so as to line the interior thereof and then admitting fluid under pressure to the interior of the mould under the requisite temperature conditions, the said fluid being in direct contact with the said mouldable composition.

2. A method of manufacturing open hollow articles with a constricted open neck portion from artificial resin by moulding under the action of heat and pressure including the steps of spraying a mouldable artificial resin composition into an assembled separable hollow mould, so as to line the inside of the mould, said mould having a constricted inlet for moulding the neck of the article, forcing air under pressure through the constricted inlet into the interior of the lined mould and into direct contact therewith, and maintaining the air in the mould under the requisite moulding temperature and pressure.

3. A method for making an open artificial resinous hollow body of variant cross section which comprises, heating a closed mould of variant cross section, spraying the inner walls of said closed mould with an artificial resinous powder, introducing a gas under pressure into the said closed mould and against the said resinous powder on the inner walls of the mould.

4. A method of manufacturing open hollow articles or vessels having a constricted neck portion, from artificial resins by moulding under the action of heat and pressure including the steps of heating a mould having a constricted aperture, blowing mouldable artificial resin powder through said aperture on to the inner walls of the mould by means of compressed air and maintaining within the mould the temperature and air pressure necessary for the pressure moulding of the resin.

HEINRICH HOENIG.